(12) United States Patent  
Anerousis et al.

(10) Patent No.: US 7,937,347 B2  
(45) Date of Patent: May 3, 2011

(54) METHOD AND APPARATUS FOR COMPONENT ASSOCIATION INFERENCE, FAILURE DIAGNOSIS AND MISCONFIGURATION DETECTION BASED ON HISTORICAL FAILURE DATA

(75) Inventors: Nikolaos Anerousis, Chappaqua, NY (US); Hani T. Jamjoom, White Plains, NY (US); Yun Mao, Edison, NJ (US); Shu Tao, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 11/762,229

(22) Filed: Jun. 13, 2007

(65) Prior Publication Data

US 2008/0313118 A1    Dec. 18, 2008

(51) Int. Cl.
*G06N 5/00* (2006.01)
(52) U.S. Cl. ............. 706/45; 706/47; 706/62; 714/100; 714/25; 714/26
(58) Field of Classification Search .................. None
See application file for complete search history.

(56) References Cited

U.S. PATENT DOCUMENTS

| | | | |
|---|---|---|---|
| 7,003,433 B2 * | 2/2006 | Yemini et al. | 702/183 |
| 7,475,293 B1 * | 1/2009 | Little et al. | 714/48 |
| 7,529,974 B2 * | 5/2009 | Thibaux et al. | 714/26 |
| 2003/0225932 A1 * | 12/2003 | Bae et al. | 709/321 |
| 2005/0004944 A1 * | 1/2005 | Cossins et al. | 707/104.1 |
| 2005/0246354 A1 * | 11/2005 | Tamayo et al. | 707/100 |
| 2007/0161380 A1 * | 7/2007 | Fok et al. | 455/456.1 |
| 2008/0004904 A1 * | 1/2008 | Tran | 705/2 |
| 2008/0140269 A1 * | 6/2008 | Naimer et al. | 701/7 |

OTHER PUBLICATIONS

RR Kompella, J Yates, A Greenberg, AC Snoeren, IP Fault Localization Via Risk Modeling In Proceedings of Networked Systems Design and Implementation (NSDI), 2005, 15 pages.

Minaxi Gupta and Mani Subramanian "Preprocessor Algorithm for Network Management Codebook". USENIX 1st Workshop on Intrusion Detection and Monitoring (IS) 1999 , 9 pages.

Srikanth Kandula, Dina Katabi and Jean-Philippe Vasseur Shrink: A Tool for Failure Diagnosis in IP Networks ACM SIGCOMM Workshop on mining network data (MineNet-05) Philadelphia PA Aug. 2005, 6 pages.

Daniel D. Lee and H. Sebastian Seung. Algorithms for non-negative matrix factorization In Proceedings of Neural Information Processing Systems (NIPS), pp. 556-562, 2000.

(Continued)

*Primary Examiner* — Omar F Fernandez Rivas
(74) *Attorney, Agent, or Firm* — Ryan, Mason & Lewis, LLP

(57) ABSTRACT

A method (which can be computer implemented) for inferring component associations among a plurality of components in a distributed computing system includes the steps of obtaining status information for each pertinent component of the plurality of components, forming an N by D matrix, X, based on the status information, and factorizing the matrix X to obtain a first matrix indicative of the component associations to be inferred and a second matrix indicative of failure explanations for corresponding ones of the probe instances. N is a number of probe instances associated with a given time frame. D is a number of the plurality of components for which the associations are to be inferred. Techniques are also presented for forming a database with the status information.

35 Claims, 3 Drawing Sheets

OTHER PUBLICATIONS

Andrew Y. Ng, Michael I Jordan, and Yair Weiss, On spectral clustering: Analysis and an algorithm., in NIPS Thomas G Dietterich Suzanne Becker and Zoubin Ghahramani Eds 2001 pp. 849-856 MIT Press.

Kompela et al., "IP Fault Localization Via Risk Modeling", In Proceedings of Networked Systems Design and Implementation (NSDI), 2005, 15 pages.

Gupta et al., "Preprocessor Algorithm for Network Management Codebook", USENIX 1st Workshop on Intrusion Detection and Monitoring (IS) 1999, 9 pages.

Kandula et al., "Shrink: A Tool for Failure Diagnosis in IP Networks", ACM SIGCOMM Workshop on mining network data (MineNet-05), Philadelphia, PA, Aug. 2005, 6 pages.

Lee et al., "Algorithms for non-negative matrix factorization", In Proceedings of Neural Information Processing Systems (NIPS), pp. 556-562, 2000.

Ng et al., "On spectral clustering: Analysis and an algorithm", in NIPS, Thomas G. Dietterich, Suzanne Becker, and Zoubin Ghahramani, Eds. 2001, pp. 849-856, MIT Press.

Google Book Search: C.M. Bishop, "Neural Networks for Pattern Recognition", Oxford University Press, 1995. pp. 310-319 Downloaded from http://books.google.com/books?id=-aAwQO__-rXwC&pg=PP1&ots=FHNOxmEYgt&dq=Neural on Jun. 11, 2007.

\* cited by examiner

METHOD AND APPARATUS FOR COMPONENT ASSOCIATION INFERENCE, FAILURE DIAGNOSIS AND MISCONFIGURATION DETECTION BASED ON HISTORICAL FAILURE DATA

FIELD OF THE INVENTION

The present invention relates to the electrical, electronic, and computer arts, and, more particularly, to dealing with failures in computer systems.

BACKGROUND OF THE INVENTION

Diagnosing component failures in distributed systems and detecting topology mis-configurations are important goals in the computing field. Health monitoring, automated diagnosing and localizing failures are important in large-scale distributed systems. Existing solutions on automated failure diagnosis require complete knowledge of the component association in the system. Examples of known solutions are:

Reference 1: R R Kompella, J Yates, A Greenberg, and A C Snoeren. "IP Fault Localization via Risk Modeling." In Proceedings of Networked Systems Design and Implementation (NSDI), 2005.

Reference 2: Minaxi Gupta and Mani Subramanian. "Preprocessor Algorithm for Network Management Codebook." USENIX 1st Workshop on Intrusion Detection and Monitoring (ID) 1999

Reference 3: Srikanth Kandula, Dina Katabi and Jean-Philippe Vasseur. "Shrink: A Tool for Failure Diagnosis in IP Networks." ACM SIGCOMM Workshop on mining network data (MineNet-05), Philadelphia, Pa., August 2005

These known solutions rely heavily on completely known component associations to diagnose component failures. However, part of this information is often unavailable; for example, in many real-world distributed systems, topologies or failure associations are often incomplete, if not entirely missing. Existing solutions cannot be directly applied in such scenarios. Even if the complete association information is given, they are usually manually or semi-manually configured so that mis-configuration is inevitable due to human errors. A new solution is needed to cope with missing information in the association information, to enable failure diagnosis, and detect potential mis-configurations.

It would thus be desirable to overcome the limitations in previous approaches.

SUMMARY OF THE INVENTION

Principles of the present invention provide techniques for component association inference, failure diagnosis and mis-configuration detection based on historical failure data. In one aspect, an exemplary method (which can be computer implemented) for inferring component associations among a plurality of components in a distributed computing system includes the steps of obtaining status information for each pertinent component of the plurality of components, forming an N by D matrix, X, based on the status information, and factorizing the matrix X to obtain a first matrix indicative of the component associations to be inferred and a second matrix indicative of failure explanations for corresponding ones of the probe instances. N is a number of probe instances associated with a given time frame. D is a number of the plurality of components for which the associations are to be inferred.

One preferred technique for gathering the status information is discussed further hereinbelow. In one or more instances, the pertinent components are end-point components ("End-point components" are those devices that are located at the edge of a network, by way of example and not limitation, cable modems in a cable network) The status information is preferably obtained from a database.

Another exemplary method step is forming an N by D matrix, X, based on the status information. The parameters N and D are defined hereinbelow. Another step in the exemplary method includes factorizing the matrix X to obtain a first matrix indicative of the component associations to be inferred and a second matrix indicative of failure explanations for corresponding ones of the probe instances. In one or more embodiments, the first and second matrices are, respectively, W and H. They are "indicative" of component associations and failure associations and can be manipulated as described herein to generate U and V.

Thus, the first matrix indicative of the component associations to be inferred can be the matrix W, having dimensions N by R, where R is the number of failure groups representing the component associations to be inferred. Further, the second matrix indicative of the failure explanations for the corresponding ones of the probe instances can be the matrix H having dimensions R by D.

In one or more embodiments, an additional step includes setting initial values of the matrix W and the matrix U to random numbers within a range between zero and one. The endpoints zero and one are included in the allowed range. The values in matrices W and H are typically within the 0 and 1 range after the performance of a "normalization" step to be discussed shortly. In a currently preferred non-limiting embodiment, the factorizing comprises non-negative matrix factorization.

In one or more embodiments, the matrices W and H each have a plurality of column vectors and each of the column vectors has a maximal element. In such instances, additional steps can include normalizing the matrix W such that the maximal element of each of the column vectors of the matrix W is one, and normalizing the matrix H such that the maximal element of each of the column vectors of the matrix H is one. Both of these steps are performed in the currently preferred embodiment.

Two additional steps can include generating a binary matrix U based on the matrix W, and generating a binary matrix V based on the matrix H. The matrix V has a plurality of row vectors and the matrix U has also has a plurality of low vectors. Each of the row vectors of the matrix V represents a given one of the component associations to be inferred, and each of the low vectors of the matrix U represents a given one of the failure explanations for the corresponding ones of the probe instances, as per block 208.

The steps of generating the binary matrix U and the binary matrix V can be carried out by applying relationships: described hereinbelow. Advantageously, one or more embodiments of the invention can be carried out even where a priori information pertaining to the component associations is incomplete or even non-existent. Further, one or more embodiments of the invention are operable without geographic information. However, where such information is available, it may be employed. In such cases, the step of obtaining status information for each pertinent component of the plurality of components further includes obtaining geographic location information for at least some of the plurality of components. The geographic location information can, in some instances, be longitude and latitude information. In some instances, such latitude and longitude information is obtained directly. In other instances, additional steps can include obtaining physical address information, and converting the address information to the latitude and longitude information.

In one or more embodiments, additional steps can include clustering the D components into R clusters, and setting initial values of the matrix W and the matrix H in accordance with an assumption that the R clusters comprise the R failure groups. The skilled artisan will be able to perform such steps, given the teachings herein. In some instances, after inferring the component associations based on the first matrix indicative of the component associations to be inferred, an additional step includes checking the geographic location information against the inferred component associations to identify one or more mis-configurations. In some instances, the component associations to be inferred are represented by a plurality of failure groups and the checking comprises examining the failure groups for geographic outliers (one (or more) of the components in a failure group has a substantially long distance to the remaining components in the same group). Furthermore, in a case when the geographic location information is available for at least some of the plurality of components, the forming and factorizing steps can be based on assuming associated ones of the components are more likely to fail simultaneously due to shared risk, and assuming that physically close ones of the components are more likely to be associated together.

In one or more instances, the component associations are inferred as described herein, and health status of select ones of the components of the distributed system is obtained, based on the second matrix indicative of failure explanations for corresponding ones of the probe instances. Advantageously, presentation (to an operator of the system) of (i) topology information, based on the component associations, and/or (ii) the health status of the select ones of the components, is facilitated. In some instances, the first matrix indicates multiple topological levels, in which case the additional step can be performed of repeating pertinent steps, such as the forming and factorizing steps, for at least one sub-association group corresponding to at least one additional one of the multiple topological levels.

In another aspect, an exemplary method (which can be computer implemented) for forming a database useful in inferring component associations among a plurality of components in a distributed computing system includes the steps of monitoring status information for each pertinent component of the plurality of components and recording the status information in the database when predetermined conditions are present. The monitoring can include probing in a series of probe instances, each of the instances pertaining to a substantially contemporaneous time stamp.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps These and other features, aspects, and advantages of the present invention will become apparent from the following detailed description of illustrative embodiments thereof which is to be read in connection with the accompanying drawings.

BRIEFS DESCRIPTION OF THE DRAWINGS

DETAILED DESCRIPTION OF PREFERRED EMBODIMENTS

Figure 1:
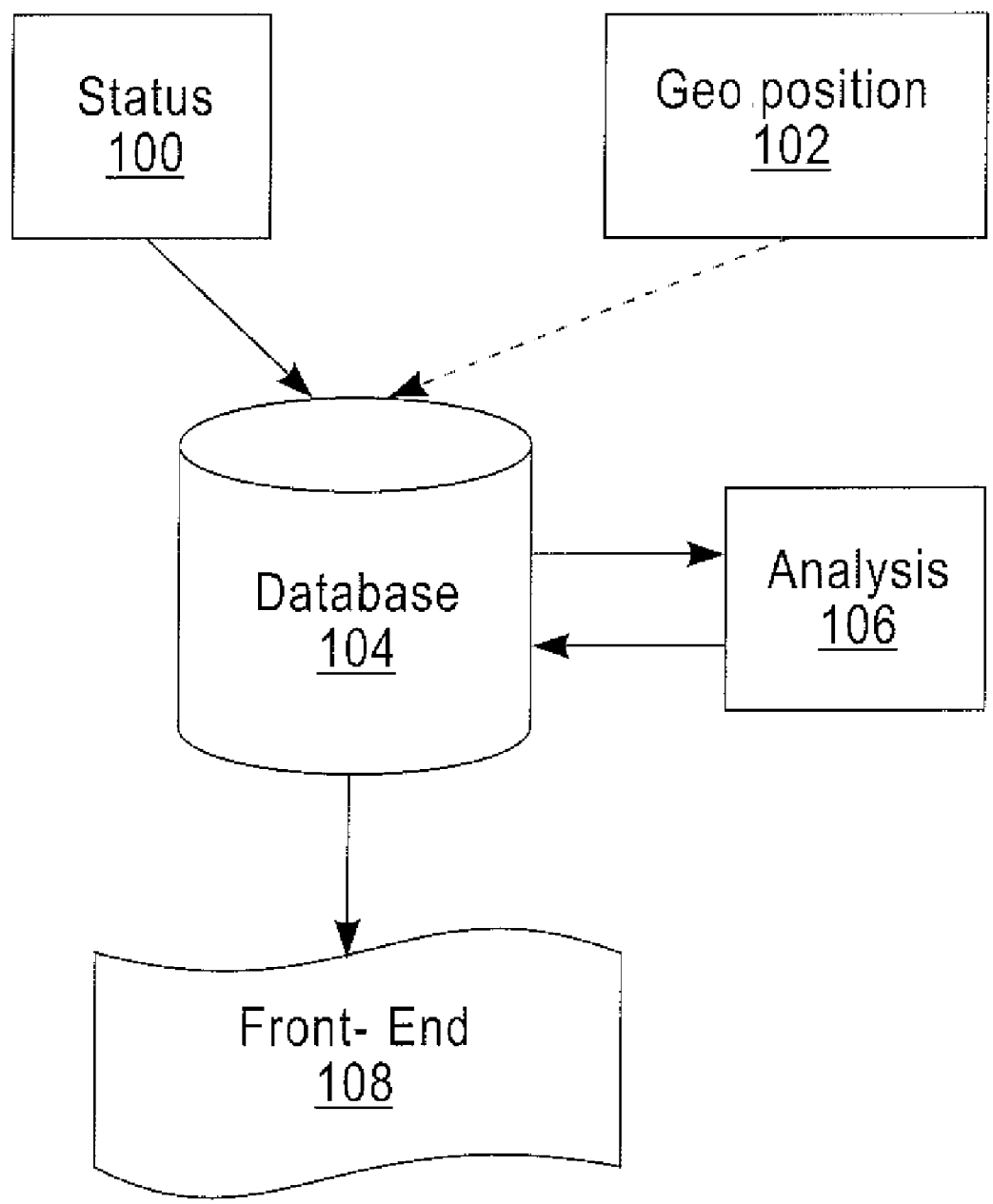
FIG. 1 illustrates system architecture for an exemplary, non-limiting embodiment of the invention.

One or more exemplary embodiments of the invention are capable of one or more of (1) discovering hidden topologies in distributed environments, (2) failure diagnosis with incomplete topology, and (3) detecting mis-configurations in the topology. One significant aspect of one or more embodiments of the invention is leveraging the information from both temporal and geographical dimensions to infer component associations, and to use it to detect mis-configurations. As input one or more exemplary embodiments of the system accept the following:

Input 1: The status of each end-point component in the distributed system is monitored and recorded. Status of these components can be either manually or automatically collected by sending probes to them periodically or when certain conditions are met (for example, when a pre-defined threshold is exceeded); and Input 2: The geographic location of each component (for example, latitude and longitude).

Note that none of the information above requires connectivity information between components. Geographic location of the components can be, for example, the billing addresses of the end customers, which awe easily accessible. Without having component association as a required input, one or more embodiments of the inventive failure diagnosis system are more practical than existing solutions in the real world.

Exemplary Outputs Include:

Output 1: The hidden topology of the distributed system that represent the end-point component associations; and Output 2: The health status of hidden components of the distributed system For a more detailed discussion, refer now to FIG. 1, which depicts an exemplary inventive system. The system has the following inputs:

(I.1) A first input is the status of each end-point component in the distributed system, as per block 100. The end-point component status is represented by a binary value, for example, 1 as failure and 0 as success. Observations made to different components are grouped based on timestamps. Each probe instance contains the status of components which are observed within a short time period. In one embodiment, all probes awe persisted into a database on storage module 104. In another embodiment, only that portion of the probes that contain failure information is persisted. One possible exemplary approach is persisting failure information after a specific threshold is passed, as detected at the higher-level network component. For instance, if a higher-level node detects that the ratio of the number of failed components to the number of total components exceeds a predefined threshold, it can invoke probes to all of its end-point components and can record the results in a database, such as a database on storage module 104.

(I.2) A second input is the geographic location of each end-point component, as per block 102. In one embodiment, they are direct inputs. In another embodiment, they are converted from the physical address of the component into geographic coordinates using an external lookup service. This input is optional to the component association inference process.

The storage module 104 collects the inputs and stores them into the aforementioned database for further analysis. The analysis module 106 fetches the inputs from the storage module, applies inventive inference techniques, such as those discussed with regard to FIG. 2 below, and sends the outputs, preferably including the hidden topology and hidden health status information, back to the storage module 104. Finally, the front-end 108 (for example a web-based user interface) obtains the outputs and displays them to the network operators.

Figure 2:
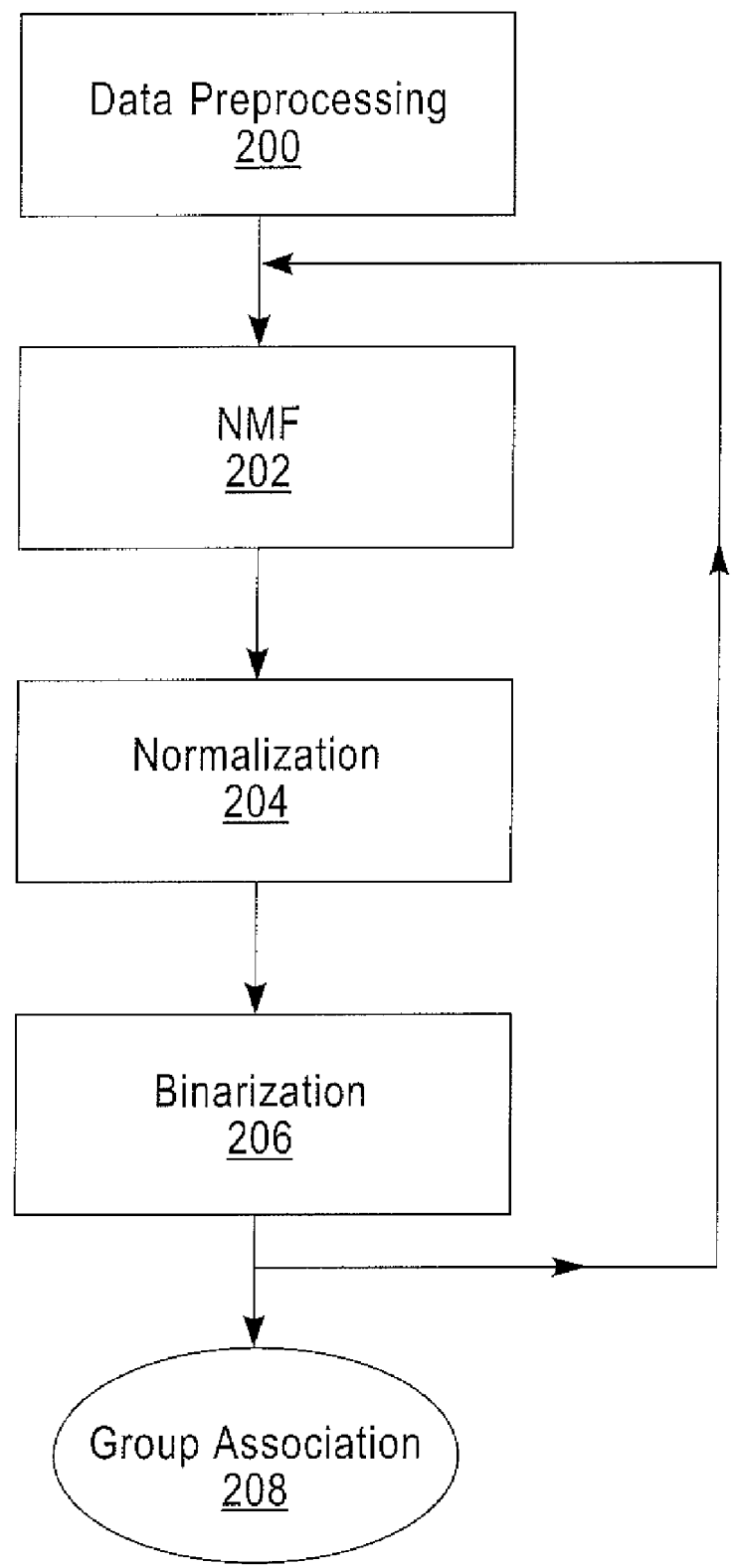
FIG. 2 illustrates a detailed flow chart of component association inference according to an aspect of the invention.

An exemplary detailed flow chart of inventive analysis techniques is shown in FIG. 2. First, the data pre-processing module 200 organizes the input into matrix format and fills in missing values if needed. For a given a time window, a list of probe instances are fetched to form an N-by-D binary matrix X, where N is the number of probe instances, and D is the number of components.

In a basic inference case, geographic information is not required to infer component association. After the failure matrix X is obtained, we first apply non-negative matrix factorization (NMF) techniques 202 to factorize X into two smaller matrices W and H, with the dimensions of N-by-R and R-by-D respectively NMF is known per se to the skilled artisan, for example, from reference 4 below:

Reference 4: Daniel D. Lee and H. Sebastian Seung. "Algorithms for non-negative matrix factorization." In Proceedings of Neural Information Processing Systems (NIPS), pages 556-562, 2000.

Given the teachings herein, the skilled artisan will be readily able to adapt known NMF techniques to implement preferred embodiments of the present invention. The initial values of W and H are set to be random numbers within the range [0, 1]. R is the number of "failure groups" that represent the component associations. W and H awe further normalized such that the maximal element of each column vector of W is 1. Finally, two binary matrices U and V are generated based on W and H by applying normalization techniques 204 and thresholding (binarization) techniques 206. Normalization and thresholding are used to transform the continuous results into binary values, mirroring the two possible observation states (for example, 1 for failure and 0 for success).

It will be appreciated that the techniques described thus far can be used to discover a single topological level. If the topology has multiple levels, the described method can be repeated on sub-association groups to further explore the hidden topology. The results of the steps described thus far are two matrices U and V, as indicated at block 208. Each low vector of matrix V represents a component association. Each low vector of matrix U represents a failure explanation of the corresponding probing instance.

It will be further appreciated that one or more inventive embodiments can solve the problem of diagnosing component failures in a distributed system with incomplete or non-existent component association information. Component associations can be automatically inferred based on historical failure data and geographical information of the components. The inferred association information can also be used to detect topology mis-configurations. Thus, in one aspect, an exemplary inventive system can provide basic inference of failure groups, without geographic information, as follows:

For a given a time frame, a list of probe instances can be fetched to form an N-by-D binary matrix X, where N is the number of probe instances, and D is the number of components;

We first apply non-negative matrix factorization (NMF) techniques to factorize X into W and H, with the dimensions of N-by-k and R-by-D respectively;

Two binary matrices U and V are generated based on W and H;

Each row vector of matrix V represents a component association. Each row vector of matrix U represents a failure explanation of the corresponding probing instance.

Further, in another aspect, an exemplary inventive system can use geographic information to provide enhanced association accuracy:

Use clustering techniques to classify D components into R clusters;

Before NMF starts, the initial values of W and H can be set accordingly, assuming the R clusters are the R component failure groups;

The rest of the process is the same as described for the basic inference without geographic information.

Note that suitable clustering techniques are as set forth in references 5 and 6 below. Such techniques are known per se to the skilled artisan and can, given the teachings herein, can be adapted by the skilled artisan to implement one or mole embodiments of the invention Reference 5: C. M. Bishop, "Neural Networks for Pattern Recognition," Oxford University Press, 1995.

Reference 6: Andrew Y Ng, Michael I. Jordan, and Yair Weiss, "On spectral clustering: Analysis and an algorithm," in NIPS, Thomas G Dietterich, Suzanna Becker, and Zoubin Ghaluamani, Eds 2001, pp. 849-856, MIT Press.

Yet further, in still another aspect, an exemplary inventive system can use component associations to detect mis-configurations:

After the component associations are estimated, such information can be used to validate against the correctness of geographic location configuration;

For example, if a given one of the components in a failure group has a substantially long distance to the remaining components in the same group (that is, the given one of the components is an outlier), the address of the component is very likely to be mis-configured.

By way of summary, review, and provision of additional information, an exemplary embodiment of an inventive method for inferring component associations among a plurality of components in a distributed computing system can include the step of obtaining status information for each pertinent component of the plurality of components, as per block 100 in FIG. 1. One preferred technique for gathering such information is discussed further hereinbelow. In one or more instances, the pertinent components are end-point components ("End-point components" are those devices that are located at the edge of a network, by way of example and not limitation, cable modems in a cable network). The status information is preferably obtained from a database, such as database 104. One preferred method of obtaining such database will be discussed hereinbelow.

Another exemplary method step is forming an N by D matrix, X, based on the status information, as per preprocessing block 200. The parameters N and D are as follows:

N is the number of probe instances associated with a given time frame; and

D is the number of the plurality of components for which the associations are to be inferred.

Another step in the exemplary method includes, as per block 202 of FIG. 2, factorizing the matrix X to obtain a first matrix indicative of the component associations to be inferred and a second matrix indicative of failure explanations for corresponding ones of the probe instances. In one or more embodiments, the first and second matrices are, respectively, W and H. They axe "indicative" of component associations and failure associations and can be manipulated as described herein to generate U and V Thus, the first matrix indicative of the component associations to be inferred can be the matrix W, having dimensions N by R, where R is the number of failure groups representing the component associations to be inferred. Further, the second matrix indicative of the failure explanations for the corresponding ones of the probe instances can be the matrix H having dimensions R by D.

In one or more embodiments, an additional step includes setting initial values of the matrix W and the matrix H to random numbers within a range between zero and one. The endpoints zero and one are included in the allowed range. The values in matrices W and H are typically within the 0 and 1 range after the performance of a "normalization" step to be discussed shortly. In a currently preferred non-limiting embodiment, the factorizing comprises non-negative matrix factorization as per block 202.

In one or more embodiments, the matrices W and H each have a plurality of column vectors and each of the column vectors has a maximal element. In such instances, additional steps can include normalizing the matrix W such that the maximal element of each of the column vectors of the matrix W is one, and normalizing the matrix H such that the maximal element of each of the column vectors of the matrix H is one. Both of these steps are performed in the currently preferred embodiment.

As per block 206, two additional steps can include generating a binary matrix U based on the matrix W, and generating a binary matrix V based on the matrix H. The matrix V has a plurality of low vectors and the matrix U has also has a plurality of tow vectors. Each of the row vectors of the matrix V represents a given one of the component associations to be inferred, and each of the row vectors of the matrix U represents a given one of the failure explanations for the corresponding ones of the probe instances, as per block 208.

The step of generating the binary matrix U can be carried out by applying the relationships:

$$U_{ij}=1 \text{ if } W_{ij}>\text{Threshold; other wise, } U_{ij}=0 \quad (1)$$

The step of generating the binary matrix V can be carried out by applying the relationships:

$$V_{ij}=1 \text{ if } H_{ij}=\max(H_{kj}) \text{ and } H_{ij}>\text{Threshold and}$$
$$H_{ij}>\text{Threshold}\times\max(H_{id}\}, \text{ where } k=1\ldots R \text{ and}$$
$$d=1\ldots D; \text{ otherwise, } V_{ij}=0 \quad (2)$$

One exemplary, non-limiting value for the Threshold is 0.5, but the skilled artisan, given the teachings herein, can select other values of the Threshold as appropriate for binarization in a given case.

Advantageously, one or more embodiments of the invention can be carried out even where a priori information pertaining to the component associations is incomplete or even non-existent. Further, one or more embodiments of the invention are operable without geographic information. However, where such information is available, it may be employed. In such cases, the step of obtaining status information for each pertinent component of the plurality of components further includes obtaining geographic location information for at least some of the plurality of components, as per block 102. The geographic location information can, in some instances, be longitude and latitude information. In some instances, such latitude and longitude information is obtained directly. In other instances, additional steps can include obtaining physical address information, and converting the address information to the latitude and longitude information.

In one or more embodiments, additional steps can include clustering the D components into R clusters, and setting initial values of the matrix W and the matrix H in accordance with an assumption that the R clusters comprise the R failure groups. The skilled artisan will be able to perform such steps, given the teachings herein. In some instances, after inferring the component associations based on the first matrix indicative of the component associations to be inferred (for example, by carrying out appropriate steps described in connection with FIGS. 1 and 2, such as generating U and V, and so on), an additional step includes checking the geographic location information against the inferred component associations to identify one or more mis-configurations. In some instances, the component associations to be inferred axe represented by a plurality of failure groups, as per block 208, and the checking comprises examining the failure groups for geographic outliers (one (or more) of the components in a failure group has a substantially long distance to the remaining components in the same group), as discussed hereinabove. Furthermore, in case when the geographic location information is available for at least some of the plurality of components, the forming and factorizing steps can be based on assuming associated ones of the components are more likely to fail simultaneously due to shared risk, and assuming that physically close ones of the components are more likely to be associated together.

In one or more instances, the component associations are inferred as described herein, and health status of select ones of the components of the distributed system is obtained, based on the second matrix indicative of failure explanations for corresponding ones of the probe instances Advantageously, presentation (to an operator of the system) of (i) topology information, based on the component associations, and/or (ii) the health status of the select ones of the components, is facilitated. In some instances, the first matrix indicates multiple topological levels, in which case the additional step can be performed of repeating pertinent steps, such as the forming and factorizing steps, for at least one sub-association group corresponding to at least one additional one of the multiple topological levels.

A preferred method for forming a database, such as database 104, useful in inferring component associations among a plurality of components in a distributed computing system, will now be described. Such method, and computer storage media, apparatuses, or systems embodying it, may be independent or may be integrated with the above-described method for inferring component associations, and computer storage media, apparatuses, or systems embodying it. In the exemplary method of forming database 104, one step includes monitoring status information for each pertinent component of the plurality of components. Preferably, the status information is binary, with one comprising failure and zero comprising success; however, the definition could be reversed, or other types of status information could be used. The monitoring can include probing in a series of probe instances, each of the instances pertaining to a substantially contemporaneous time stamp. Another step can include recording the status information in the database when predetermined conditions are present. In some instances, the data is always recorded, such that the predetermined conditions comprise performance of a given one of the probe instances. In other instances, you record the data only for a failure, such that the predetermined conditions comprise performance of a given one of the probe instances which yields failure information. In some cases, the probe instances are conducted periodically. In other cases, the probe instances are conducted based on occurrence of a pre-determined threshold, such as, by way of example and not limitation, a ratio of failed components to total components.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 3:
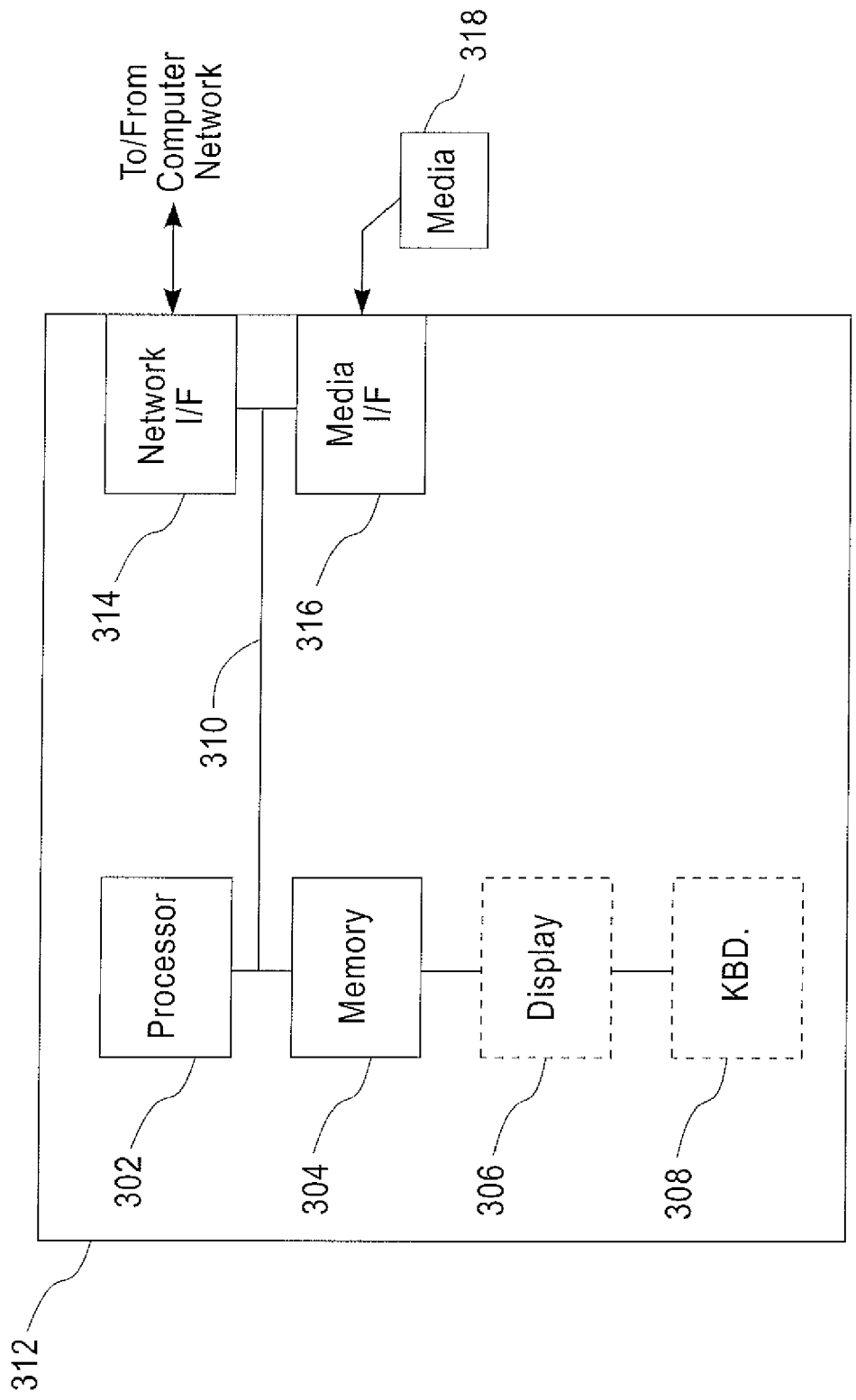
FIG. 3 depicts a computer system that may be useful in implementing one or more aspects and/or elements of the invention.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be inter connected, for example, via bus 310 as part of a data processing unit 312. Suitable interconnections, for example via bus 310, can also be provided to a network interlace 314, such as a network card, which can be provided to interface with a computer network, and to a media interface 316, such as a diskette or CD-ROM drive, which can be provided to interface with media 318

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 304), magnetic tape, a removable computer diskette (for example media 318), a random access memory (RAM), a read-only memory (ROM), a rigid magnetic disk and an optical disk. Current examples of optical disks include compact disk-read only memory (CD-ROM), compact disk-read/write (CD-R/W) and DVD A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 308, displays 306, pointing devices, and the like) can be coupled to the system either directly (such as via bus 310) or through intervening I/O controllers (omitted for clarity)

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one for more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for inferring component associations among a plurality of components in a distributed computing system, said method comprising the steps of:

obtaining status information for each pertinent component of said plurality of components;

forming an N by D matrix, X, based on said status information, where:

N comprises a number of probe instances associated with a given time frame; and

D comprises a number of said plurality of components for which said associations are to be inferred; and factorizing said matrix X to obtain a first matrix indicative of said component associations to be inferred and a second matrix indicative of failure explanations for corresponding ones of said probe instances, wherein one or more steps are performed by a hardware device.

2. The method of claim 1, wherein:

said first matrix indicative of said component associations to be inferred comprises a matrix W having dimensions N by R, where R is a number of failure groups representing said component associations to be inferred; and
said second matrix indicative of said failure explanations for said corresponding ones of said probe instances comprises a matrix H having dimensions R by D.

3. The method of claim 2, further comprising the additional step of setting initial values of said matrix W and said matrix H to random numbers within a range between zero and one.

4. The method of claim 3, wherein said factorizing comprises non-negative matrix factorization.

5. The method of claim 4, wherein said matrices W and H each have a plurality of column vectors and each of said column vectors has a maximal element, further comprising the additional steps of:
normalizing said matrix W such that said maximal element of each of said column vectors of said matrix W is one; and
normalizing said matrix H such that said maximal element of each of said column vectors of said matrix H is one.

6. The method of claim 5, further comprising the additional steps of:
generating a binary matrix U based on said matrix W; and
generating a binary matrix V based on said matrix H.

7. The method of claim 6, wherein:
said matrix V has a plurality of row vectors;
said matrix U has a plurality of row vectors;
each of said row vectors of said matrix V represents a given one of said component associations to be inferred; and
each of said row vectors of said matrix U represents a given one of said failure explanations for said corresponding ones of said probe instances.

8. The method of claim 7, wherein:
said step of generating said binary matrix U comprises applying the relationships:
$U_{ij}=1$ if $W_{ij}>$Threshold; otherwise, $U_{ij}=0$; and
said step of generating said binary matrix V comprises applying the relationships:
$V_{ij}=1$ if $H_{ij}=\max(H_{kj})$ and $H_{ij}>$Threshold and $H_1>$Threshold$\times\max(H_{id}\{$, where $k=1 \ldots R$ and $d=1 \ldots D$; otherwise, $V_{ij}=0$.

9. The method of claim 1, wherein a priori information pertaining to said component associations is one of incomplete and non-existent.

10. The method of claim 1, wherein said step of obtaining status information for each pertinent component of said plurality of components further comprises obtaining geographic location information for at least some of said plurality of components.

11. The method of claim 10, wherein:
said first matrix indicative of said component associations to be inferred comprises a matrix W having dimensions N by R, where R is a number of failure groups representing said component associations to be inferred; and
said second matrix indicative of said failure explanations for said corresponding ones of said probe instances comprises a matrix H having dimensions R by D;
further comprising the additional steps of:
clustering said D components into R clusters; and
setting initial values of said matrix W and said matrix H in accordance with an assumption that said R clusters comprise said R failure groups.

12. The method of claim 10, wherein said geographic location information comprises longitude and latitude information.

13. The method of claim 12, wherein said latitude and longitude information is obtained directly.

14. The method of claim 12, further comprising the additional steps of:
obtaining physical address information; and
converting said address information to said latitude and longitude information.

15. The method of claim 10, further comprising the additional steps of:
inferring said component associations based on said first matrix indicative of said component associations to be inferred; and
checking said geographic location information against said inferred component associations to identify at least one mis-configuration.

16. The method of claim 15 wherein said component associations to be inferred are represented by a plurality of failure groups and wherein said checking comprises examining said failure groups for geographic outliers.

17. The method of claim 1, wherein in said step of obtaining status information for each pertinent component of said plurality of components, said pertinent components comprises end-point components.

18. The method of claim 1, further comprising the additional steps of:
inferring said component associations based on said first matrix indicative of said component associations to be inferred;
obtaining health status of select ones of said components of said distributed system, based on said second matrix indicative of failure explanations for corresponding ones of said probe instances; and
facilitating presentation of (i) topology information, based on said component associations, and (ii) said health status of said select ones of said components, to an operator of said system.

19. The method of claim 1, wherein said status information is obtained from a database.

20. The method of claim 1, wherein said first matrix indicates multiple topological levels, further comprising the additional step of repeating said forming and factorizing steps for at least one sub-association group corresponding to at least one additional one of said multiple topological levels.

21. The method of claim 1, wherein:
said step of obtaining status information for each pertinent component of said plurality of components further comprises obtaining geographic location information for at least some of said plurality of components; and
said forming and factorizing steps are based on:
assuming associated ones of said components are more likely to fail simultaneously due to shared risk; and
assuming that physically close ones of said components are more likely to be associated together.

22. A method for forming a database useful in inferring component associations among a plurality of components in a distributed computing system, said method comprising the steps of:
obtaining a location of each of at least two of said plurality of components;
determining a topology of said at least two of said plurality of components based on said location;
monitoring status information for each pertinent component of said plurality of components, said monitoring comprising probing in a series of probe instances, each of said instances pertaining to a substantially contemporaneous time stamp; and
recording said status information in said database when predetermined conditions are present, wherein said status information is based on said determined topology and wherein one or more steps are performed by a hardware device.

23. The method of claim 22, wherein said predetermined conditions comprise performance of a given one of said probe instances.

24. The method of claim 22, wherein said predetermined conditions comprise performance of a given one of said probe instances which yields failure information.

25. The method of claim 22, wherein said probe instances are conducted periodically.

26. The method of claim 22, wherein said probe instances are conducted based on occurrence of a pre-determined threshold.

27. The method of claim 26, wherein said pre-determined threshold comprises a ratio of failed components to total components.

28. The method of claim 22, wherein said status information is binary, with one comprising failure and zero comprising success.

29. A computer program product comprising a tangible computer useable readable storage medium including computer usable program code for inferring component associations among a plurality of components in a distributed computing system, said computer program product including:
    computer usable program code for obtaining status information for each pertinent component of said plurality of components;
    computer usable program code for forming an N by D matrix, X, based on said status information, where:
        N comprises a number of probe instances associated with a given time frame; and
        D comprises a number of said plurality of components for which said associations are to be inferred; and
    computer usable program code for factorizing said matrix X to obtain a first matrix indicative of said component associations to be inferred and a second matrix indicative of failure explanations for corresponding ones of said probe instances.

30. The computer program product of claim 29, wherein:
    said first matrix indicative of said component associations to be inferred comprises a matrix W having dimensions N by R, where R is a number of failure groups representing said component associations to be inferred; and
    said second matrix indicative of said failure explanations for said corresponding ones of said probe instances comprises a matrix H having dimensions R by D.

31. The computer program product of claim 30, wherein:
    said factorizing comprises non-negative matrix factorization;
    said matrices W and H each have a plurality of column vectors and each of said column vectors has a maximal element; and
    said computer program product further comprises:
        computer usable program code for normalizing said matrix W such that said maximal element of each of said column vectors of said matrix W is one;
        computer usable program code for normalizing said matrix H such that said maximal element of each of said column vectors of said matrix H is one;
        computer usable program code for setting initial values of said matrix W and said matrix H to random numbers within a range between zero and one;
        computer usable program code for generating a binary matrix U based on said matrix W; and
        computer usable program code for generating a binary matrix V based on said matrix H.

32. An apparatus for inferring component associations among a plurality of components in a distributed computing system, the apparatus comprising:
    a memory; and
    at least one processor, coupled to the memory, operative to:
        obtain status information for each pertinent component of said plurality of components;
        form an N by D matrix, X, based on said status information, where:
            N comprises a number of probe instances associated with a given time frame; and
            D comprises a number of said plurality of components for which said associations are to be inferred; and
        factorize said matrix X to obtain a first matrix indicative of said component associations to be inferred and a second matrix indicative of failure explanations for corresponding ones of said probe instances.

33. The apparatus of claim 32, wherein:
    said first matrix indicative of said component associations to be inferred comprises a matrix W having dimensions N by R, where R is a number of failure groups representing said component associations to be inferred; and
    said second matrix indicative of said failure explanations for said corresponding ones of said probe instances comprises a matrix H having dimensions R by D.

34. The apparatus of claim 33, wherein:
    said factorizing comprises non-negative matrix factorization;
    said matrices W and H each have a plurality of column vectors and each of said column vectors has a maximal element; and
    said processor is further operative to:
        normalize said matrix W such that said maximal element of each of said column vectors of said matrix W is one;
        normalize said matrix H such that said maximal element of each of said column vectors of said matrix H is one;
        set initial values of said matrix W and said matrix H to random numbers within a range between zero and one;
        generate a binary matrix U based on said matrix W; and
        generate a binary matrix V based on said matrix H.

35. A computer program product comprising a tangible computer useable readable storage medium including computer usable program code for forming a database useful in inferring component associations among a plurality of components in a distributed computing system, said computer program product including:
    computer usable program code for obtaining a location of each of at least two of said plurality of components;
    computer usable program code for determining a topology of said at least two of said plurality of components based on said location;
    computer usable program code for monitoring status information based on said determined topology for each pertinent component of said plurality of components, said monitoring comprising probing in a series of probe instances, each of said instances pertaining to a substantially contemporaneous time stamp; and
    computer usable program code for recording said status information in said database when predetermined conditions are present, wherein said status information is based on said determined topology.

* * * * *